United States Patent
Ford et al.

(10) Patent No.: US 6,631,246 B2
(45) Date of Patent: *Oct. 7, 2003

(54) WAVELENGTH DIVISION MULTIPLEXED OPTICAL COMMUNICATION SYSTEM HAVING TUNABLE MULTI-CHANNEL DISPERSION COMPENSATING FILTERS

(75) Inventors: Joseph Earl Ford, Oakhurst, NJ (US); Keith Wayne Goossen, Aberdeen, NJ (US); Christi Kay Madsen, South Plainfield, NJ (US); James Albert Walker, Howell, NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/332,677

(22) Filed: Jun. 14, 1999

(65) Prior Publication Data

US 2003/0156846 A1 Aug. 21, 2003

(51) Int. Cl.[7] ............... G02B 6/26; H04J 14/02
(52) U.S. Cl. ............ 398/158; 398/81; 398/85; 385/24; 385/37; 385/27; 385/32
(58) Field of Search ............... 359/161, 127, 359/130, 119; 385/32, 37, 24, 27

(56) References Cited

U.S. PATENT DOCUMENTS

| | | | | |
|---|---|---|---|---|
| 5,500,761 A | * | 3/1996 | Goossen et al. | ............ 359/290 |
| 5,557,468 A | * | 9/1996 | Ip | ............... 359/615 |
| 5,710,655 A | * | 1/1998 | Rumbaugh et al. | ......... 359/249 |
| 5,710,656 A | * | 1/1998 | Goossen | ..................... 359/291 |
| 6,002,513 A | * | 12/1999 | Goossen et al. | ............ 359/291 |
| 6,147,788 A | * | 11/2000 | Mamyshev et al. | ......... 359/173 |
| 6,337,753 B1 | * | 1/2002 | Goossen | ..................... 359/124 |

OTHER PUBLICATIONS

Ford, Joseph E., and Walker, James A., "Dynamic Spectral Power Equalization Using Micro–Opto–Mechanics", *IEEE Photonics Technology Letters*, vol. 10, No. 10, Oct. 1998, pp. 1440–1442.

Goossen, K.W. et al., "Silicon Modulator Based on Mechanically–Active Anti–Reflection Layer with 1 Mbit/sec Capability for Fiber–in–the–Loop Applications", *IEEE Photonics Technology Letters*, vol. 6, No. 9, Sep. 1994, pp. 1119–1121.

Madsen, C.K. and Lenz, G., "Optical All–Pass Filters for Phase Response Design with Applications for Dispersion Compensation", *IEEE Photonics Technology Letters*, vol. 10, No. 7, Jul. 1998, pp. 994–996.

* cited by examiner

*Primary Examiner*—Leslie Pascal
*Assistant Examiner*—David C Payne

(57) ABSTRACT

In accordance with the invention, a WDM optical communication system includes a new tunable multi-channel dispersion compensating filter having low loss, low polarization dependence and capable of compensating many channels over a large wavelength range. In essence, the filter comprises an optical cavity with a near 100% reflector on one side and a variable partial reflector on the other side. The device acts as a tunable all-pass filter.

6 Claims, 4 Drawing Sheets

WAVELENGTH DIVISION MULTIPLEXED OPTICAL COMMUNICATION SYSTEM HAVING TUNABLE MULTI-CHANNEL DISPERSION COMPENSATING FILTERS

FIELD OF THE INVENTION

This invention relates to optical communication systems and, in particular to wavelength division multiplexed optical communication systems (WDM and dense WDM systems) having tunable multi-channel dispersion compensating filters.

BACKGROUND OF THE INVENTION

Optical communication systems are usually based on high purity silica optical fiber as the transmission medium. Conventional terrestrial systems are typically designed to transmit optical signals in a wavelength range where longer wavelength components are subject to slightly longer propagation time delay than shorter wavelengths (positive chromatic dispersion). To prevent this dispersion from deteriorating the information content of the optical signals, early systems used a single channel at a wavelength where dispersion is low or zero.

As it has become desirable to utilize many channels over a wider range of optical wavelengths (WDM systems), chromatic dispersion has required more precise compensation. WDM systems are important for their ability to transmit vast amounts of information and for their ability to incorporate network functions such as add/drop and cross connecting. But as the bit rate of WDM channels increases, chromatic dispersion compensation becomes critical.

Typically dispersion compensation schemes for WDM systems involve the use of dispersion compensating fiber and dispersion compensating gratings. The transmission fibers used in terrestrial systems typically exhibit net positive chromatic dispersion which, for WDM systems, cannot be wholly compensated by dispersion fiber. Although segments of such fiber can be used to compensate the accumulated dispersion in a transmission fiber span, optimum compensation is usually achieved only for chosen channels (typically in the middle of the transmission band). There remains a residual wavelength dependent dispersion in channels located at the extremes of the transmission band due to the dispersion slope.

Compensating the accumulated dispersion of the extreme channels can require a dispersion compensating grating (DCG). DCGs are chirped fiber Bragg gratings used in reflection mode and oriented so that the long wavelengths are reflected first before short wavelengths. In this manner, optical pulses broadened due to the accumulated positive chromatic dispersion can be recompressed in time. Typical arrangement using DCGs are described in U.S. Pat. No. 4,953,939 issued to R. E. Epworth on Sep. 4, 1990 and U.S. Pat. No. 5,701,188 issued to M. Shigematsu et al. on Dec. 23, 1997, both of which are incorporated herein by reference. One of the main advantages of using DCGs is that the amount of dispersion and the dispersion slope can be easily adjusted by setting the grating chirp parameters. Another advantage is their low non-linearity.

However conventional compensation schemes using dispersion compensating fiber and DCGs present a number of shortcomings. The dispersion compensating fibers typically introduce significant loss and respond to the input signal power in a non-linear fashion. DCGs can introduce polarization mode dispersion and, because they tend to be long, introduce group delay ripples that must be minimized. Accordingly there is a need for a new WDM communication system providing low loss, low polarization dependent compensation over a wide bandwidth.

SUMMARY OF THE INVENTION

In accordance with the invention, a WDM optical communication system includes a new tunable multi-channel dispersion compensating filter having low loss, low polarization dependence and the capability of compensating many channels over a large wavelength range. In essence, the filter comprises an optical cavity with a near 100% reflector on one side and a variable partial reflector on the other side. The device acts as a tunable all-pass filter.

BRIEF DESCRIPTION OF THE DRAWINGS

The nature, advantages and various additional features of the invention will appear more fully upon consideration of the illustrative embodiments now to be described in detail in connection with the accompanying drawings. In the drawings.

It is to be understood that these drawings are for purposes of illustrating the concepts of the invention and, except for the graphs, are not to scale.

DETAILED DESCRIPTION

Figure 1:
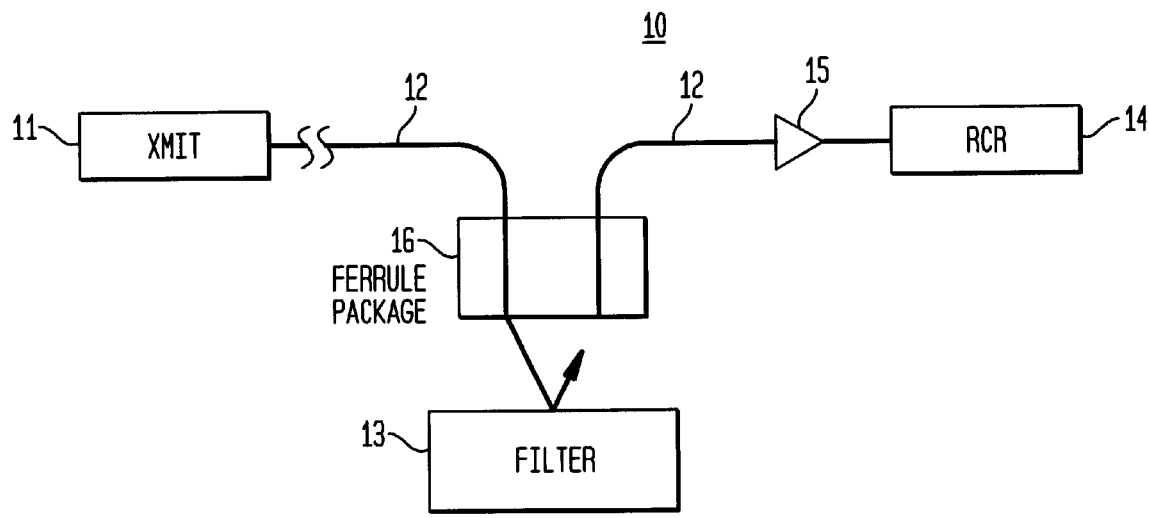
FIG. 1 schematically illustrates a WDM optical fiber communication system employing a tunable multi-channel dispersion compensating filter in accordance with the invention.

Referring to the drawings, FIG. 1 schematically illustrates a WDM optical fiber communication system 10 comprising a multiwavelength optical transmitter 11, a transmission fiber 12, and a tunable multi-channel dispersion compensating filter 13 to compensate dispersion in fiber 12. It also includes one or more multiwavelength optical receivers 14. Optionally, depending on the length of the system, an optical amplifier 15 can be disposed between the transmitter 11 and the receiver 14. Long distance transmission systems may comprise a plurality of segments of fiber 12 with respective segments interconnected by amplifiers and dispersion compensators including filters 13. Long systems may also include one or more intermediate add/drop nodes (not shown) between successive segments of transmission fiber 12.

Conveniently, the filter 13, which is a reflection device, is coupled to segments of fiber 12 by a dual fiber photonics ferrule package 16 such as that described in co-pending application Ser. No. 08/688,178 filed by Fever et al. on Jul. 26, 1996 and assigned to applicant's assignee.

In operation, multiple wavelength signal channels at wavelengths $\lambda_1, \lambda_2, \ldots, \lambda_n$ are launched by transmitter 11 down fiber 12. The channels incur loss and dispersion as they pass through the fiber. The signals can be amplified by amplifier 15 and dispersion compensated by filter 13.

Figure 2:
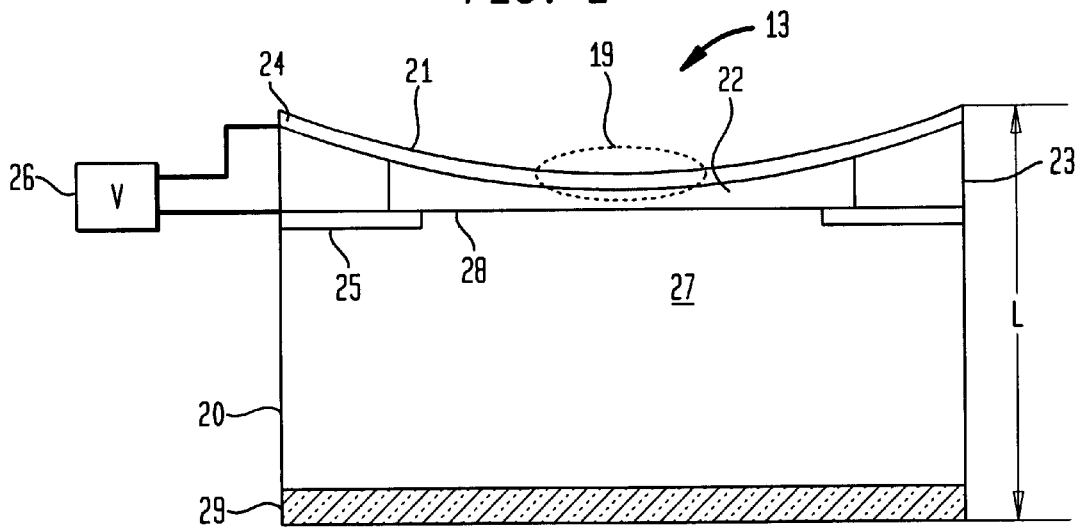
FIG. 2 illustrates a preferred embodiment of the dispersion compensating filter used in the system of FIG. 1.

FIG. 2 illustrates a preferred embodiment of a tunable multi-channel dispersion filter 13. In essence, the filter 13 is a modified form of the mechanical anti-reflection switch modulator (MARS modulator) described by K. W. Goossen et al. in U.S. Pat. No. 5,500,761 issued Mar. 19, 1996 which is incorporated herein by reference. The filter 13 is modified, as compared to the Goossen et al. device, by the inclusion of an optical cavity 27 of low loss optical material defined between a pair of parallel sides 28, 29. One side 29 is a fixed mirror (a near–100% reflector with reflectivity≧95%).

The device comprises a variable partial reflector 19, a fixed mirror 29 and an optical cavity 27 disposed in the light path between them. The partial reflector 19 comprises a substrate body 20 having a generally planar surface and a movable membrane 21 spaced generally parallel to the surface to define on gap 22 between the membrane and the substrate. The substrate 20 can. be crystalline silicon and the membrane 21 can comprise polycrystalline silicon. The membrane 21 and the substrate 20 are spaced apart by a peripheral support layer 23 of insulating material. Electrodes 24, 25 permit connection of the membrane and substrate, respectively to the terminals of a controllable voltage source 26.

The parallel sides 28, 29 define an optical cavity of thickness L. The cavity thickness determines the filter's periodicity or free spectral range (FSR). The thickness L can be chosen so that the FSR is an integral multiple of the spacing between optical channels in the system. In this way, many channels can be compensated simultaneously. The thickness L can be tuned, as by thermal tuning. A change in the cavity optical path length of $\lambda/2$ translates the filter frequency response by one complete FSR.

The spacing between membrane 21 and side 28 can be controlled by an applied voltage. When the distance between the membrane and substrate is an odd multiple of $\lambda/4$, the reflectance is a maximum. When the distance is an even multiple of $\lambda/4$, the reflectance is a minimum. If desired, the cavity length can be tuned, as by temperature tuning, to maintain wavelength locking.

Figure 3:
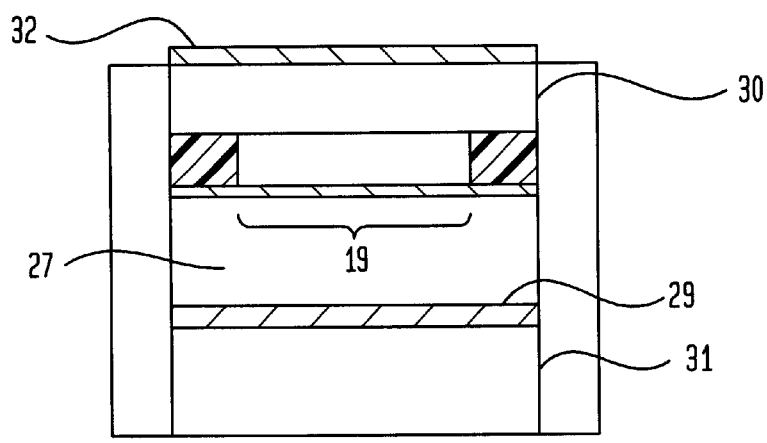
FIG. 3 shows an alternative form of the dispersion compensation filter.

FIG. 3 shows an alternative form of a tunable multi-channel dispersion filter 13 wherein the variable partial reflector 19 and the fixed mirror 29 are disposed on two separate substrates 30, 31, respectfully, and the optical cavity 27 comprises the gap between 19 and 29. Substrate 30 is advantageously transparent and preferably is provided with an antireflection coating 32.

Figure 4:
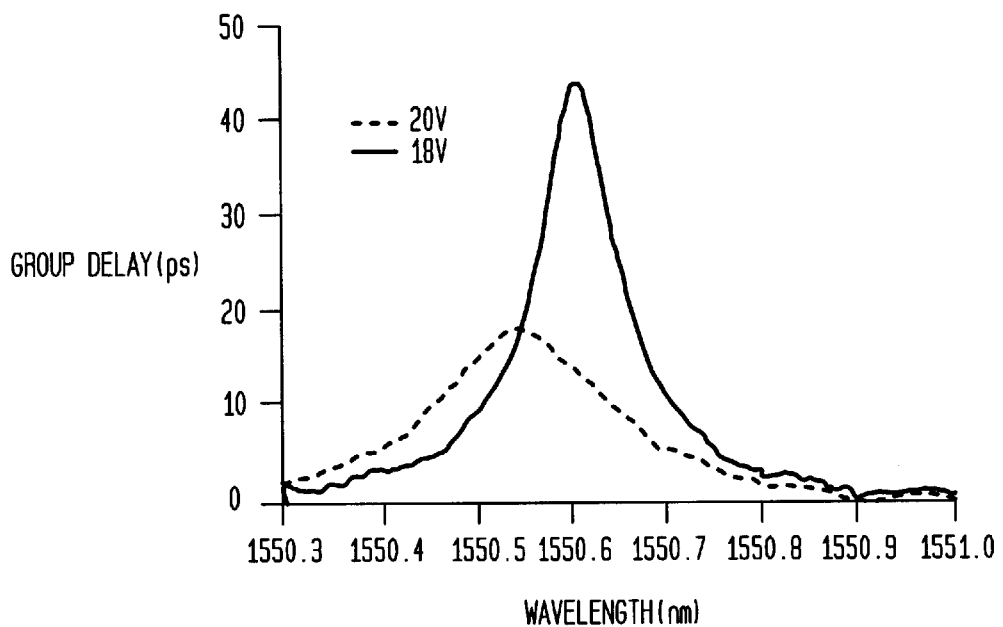
FIG. 4 is graphical illustrations useful in understanding the operation of the system and filter.

FIG. 4 is a graphical illustration showing the group delay of a signal from passing through the device of FIG. 2 for two different membrane deflections. As can be seen, the group delay of the signal is wavelength dependent. The peak delay increases as the partial reflectance increases.

The dispersion produced by the filter 13 is measured by the derivative of the filter delay with respect to wavelength. In many applications a constant dispersion is required. A composite filter having an increased passband width of nearly constant dispersion can be made by concatenating a plurality of filters 13. If desired, the filters can be offset by a controlled wavelength shift. Feedback control of the tuning can be used to obtain active stabilization.

Figure 5:
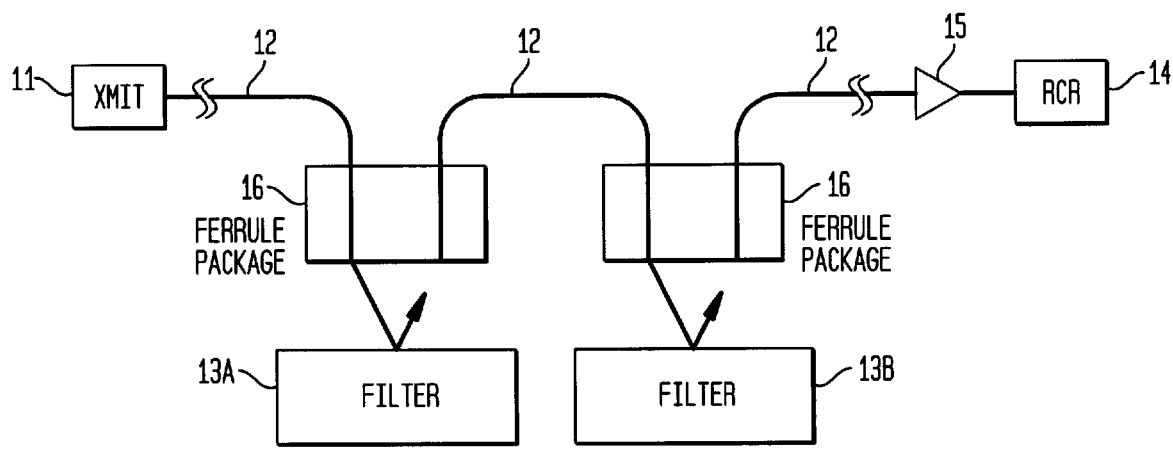
FIG. 5 illustrates an alternative two-stage filter.

FIG. 5 illustrates a composite filter 40 made by concatenating two filters 13A and 13B. Each of the filters 13A, 13B has the structure shown in FIG. 2.

Figure 6:
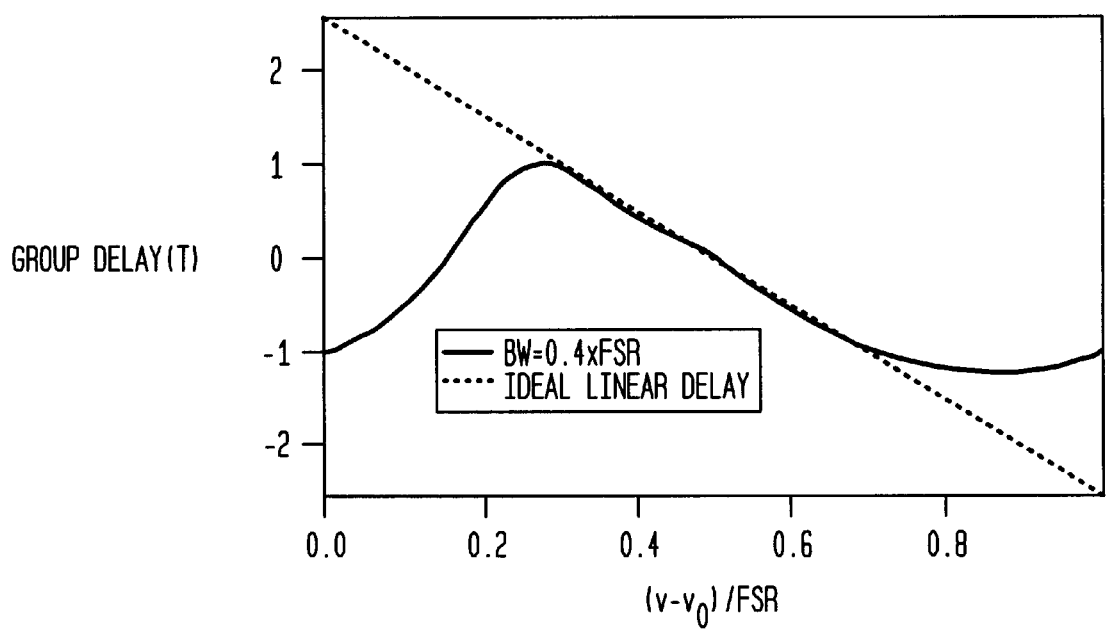
FIGS. 6, 7 and 8 are graphical illustrations useful in understanding the FIG. 5 device.

FIG. 6 shows the delay for a two stage filter of FIG. 5 over one period (FSR). The dotted line, for comparison, shows an ideal linear delay characteristic. The delay is given in units of T, defined as the time for the signal to travel one roundtrip in the cavity. For a filter with a FSR of 100 GHz, the roundtrip delay is T=10 ps. By varying the cavity reflectances and optical path lengths, the delay response is modified to produce a range of constant dispersions.

Figure 7:
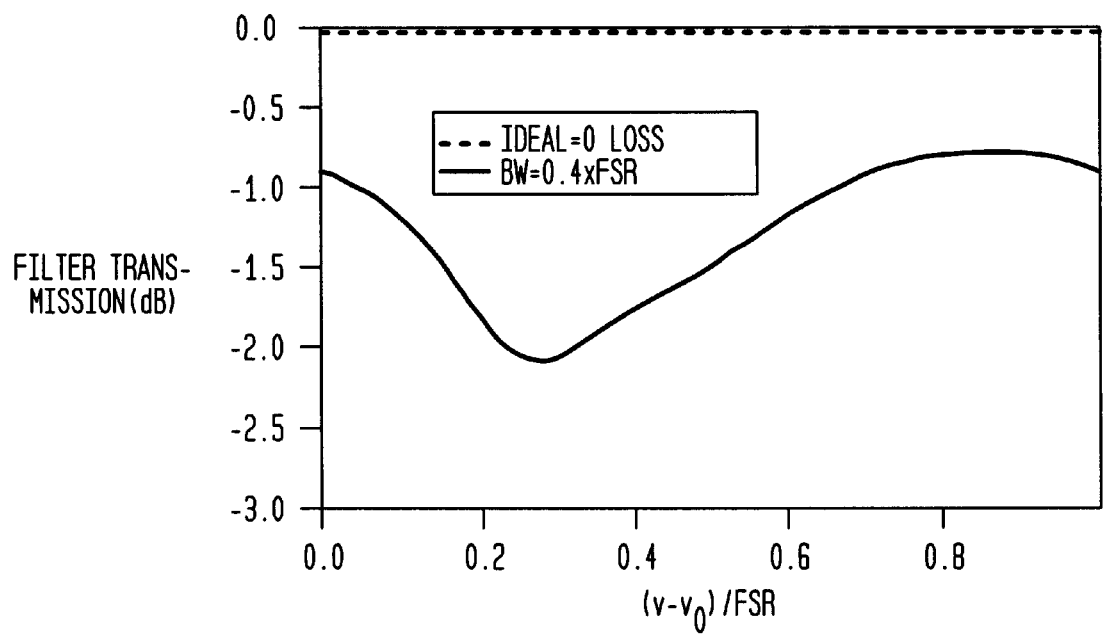

In practical filters there is some loss. FIG. 7 illustrates the effect of a typical loss of 0.65 dB loss per cavity roundtrip on the two-stage filters of FIG. 6. The loss varies approximately linearly over the passband. Smaller filter loss variations with respect to wavelength could result from smaller cavity losses.

Figure 8:
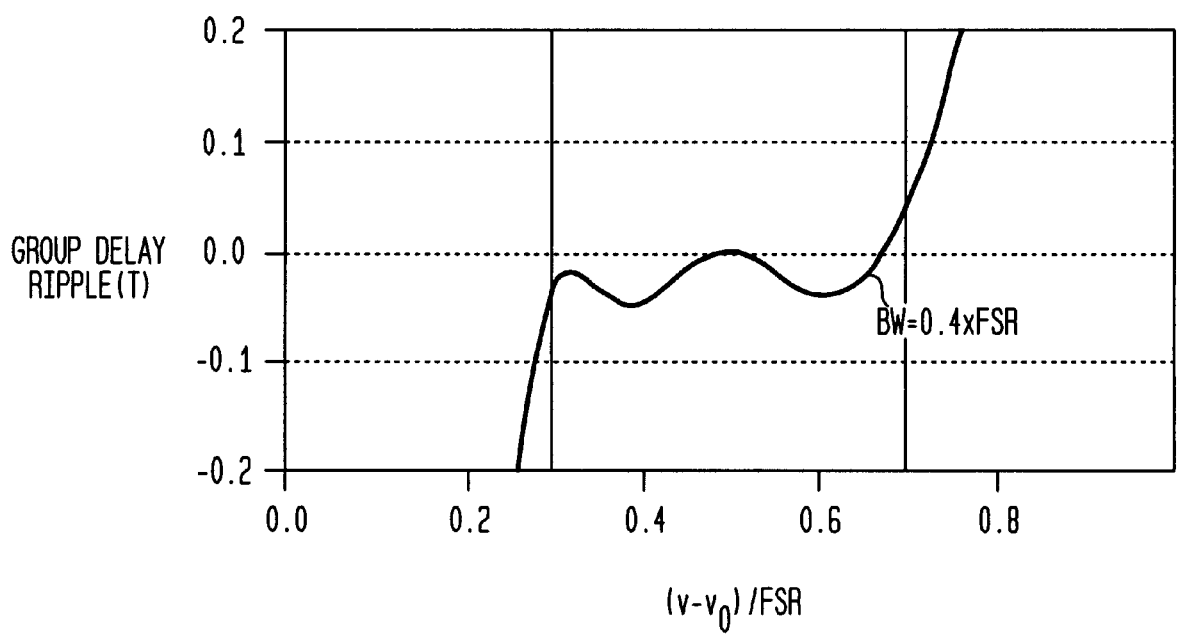

An important consideration for dispersion compensating filters is the degree to which the desired dispersion response is achieved across the passband. This achievement is measured by a figure of merit called the group delay ripple which calculates the deviation of the group delay from the desired linear response. FIG. 8 illustrates the group delay ripple for the filter of FIG. 6. As can be seen from FIG. 8, the peak-to-peak ripple is only about 0.05×T over the passband.

The passband width, dispersion, and ripple scale with the FSR. For the design example, the values for these parameters in standard units for several FSRs are given in Table 1:

TABLE 1

Design parameters for different cavity thicknesses (different FSRs) assuming a passband width equal to 40% of the FSR in each case.

| FSR (GHz) | BW+0.4 (GHz) | Dmax(ps/nm) | T(ps) | Ripple p-p(ps) |
|---|---|---|---|---|
| 100 | 40 | 62.5 | 10 | 0.5 |
| 50 | 20 | 250 | 20 | 1 |
| 25 | 10 | 1000 | 40 | 2 |
| 12.5 | 5 | 4000 | 80 | 4 |

For a 100 GHz FSR, the passband width is 40 GHz in this example. A maximum dispersion of 60 ps/nm is achieved with a ripple of less than 0.5 ps. The ripple is very small compared to chirped Bragg grating filters, which can easily have 10 ps of ripple. The sign of the filter dispersion can easily be reversed by changing the relative cavity lengths of the two-stages, for example by temperature tuning. Thus, the full tuning range is twice the peak dispersion.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed is:

1. In an optical fiber communication system comprising a wavelength division multiplexed optical transmitter, a length of optical transmission fiber for transmitting signals from the transmitter, the fiber producing unwanted chromatic dispersion, a compensator for reducing chromatic dispersion in the signals and an optical receiver for the signals, the improvement wherein:

the dispersion compensator comprises an all-pass filter comprising a variable reflectivity mirror, a high reflectivity fixed mirror, and an optical cavity in the light path between the mirrors; and the variable reflectivity mirror comprises an electrostatically movable membrane, a substrate adjacent the membrane and a controllable voltage source for applying an electrostatic field between the membrane and the substrate to move the membrane.

2. In an optical fiber communication system comprising a wavelength division multiplexed optical transmitter, a length of optical transmission fiber for transmitting signals from the transmitter, the fiber producing unwanted chromatic dispersion, a compensator for reducing chromatic dispersion in the signals and an optical receiver for the signals, the improvement wherein:

the dispersion compensator comprises an all-pass filter comprising a variable reflectivity mirror, a high reflectivity fixed mirror, and an optical cavity in the light path between the mirrors; and wherein the transmitter transmits a plurality of spaced wavelength signal channels and the optical cavity of the all pass filter is dimensioned so that the free spectral range of the filter is equal to the wavelength spacing between at least two signal channels.

3. The system of claim 2 wherein said substrate further comprises a second surface parallel to the first, said second surface supporting the fixed mirror.

4. The system of claim 2 wherein the substrate further comprises the optical cavity.

5. The system of claim 2 wherein the variable reflectivity mirror and the fixed mirror are formed on separate spaced apart substrates.

6. The system of claim 5 wherein the optical cavity comprises the space between the spaced apart substrates.

* * * * *